Oct. 12, 1937. G. A. STARK, JR 2,095,402
ART GLASS
Filed June 27, 1936
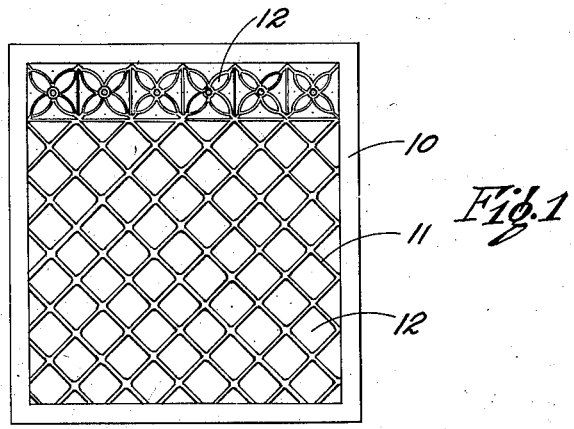
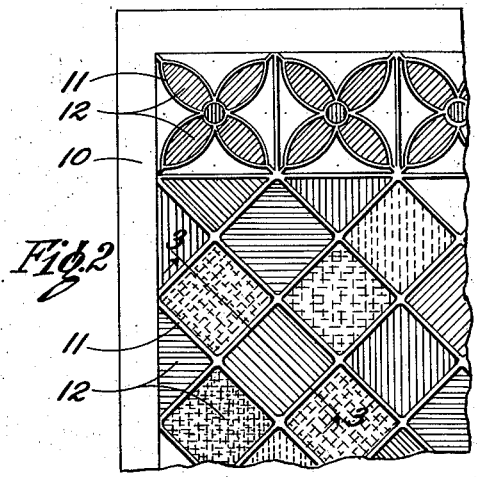
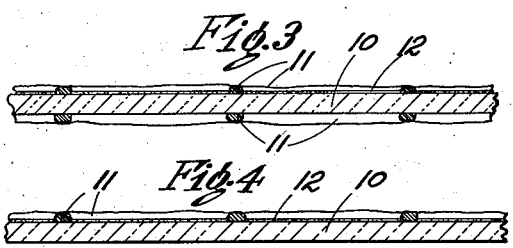
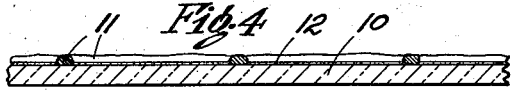
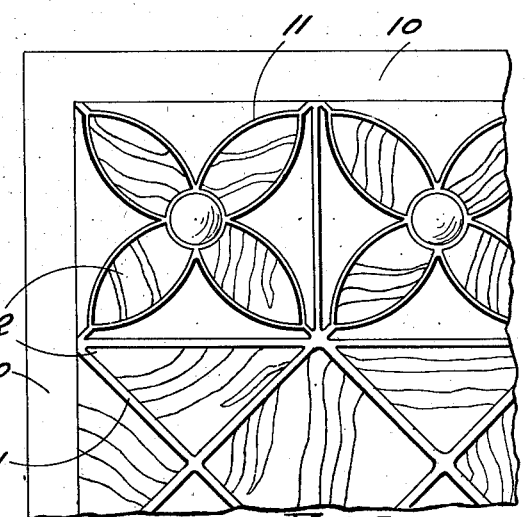
Inventor
GEORGE A. STARK, JR.
By Richey & Watts
Attorneys Patented Oct. 12, 1937

2,095,402

UNITED STATES PATENT OFFICE 2,095,402

ART GLASS

George A. Stark, Jr., Brecksville, Ohio

Application June 27, 1936, Serial No. 87,719

5 Claims. (Cl. 41—31)

This invention relates broadly to an improved method of producing works of art and more specifically to the application and treatment of materials for the production of vermicular ornamentation, replicas of leaded stained glass and similar art ware.

One of the objects of the invention resides in the method of handling certain artists' materials to produce a translucent body with diffused variegated color stratification therein, and to arrange the strata lineation in contiguous areas of such bodies in angular relation to each other so that the article formed therefrom will resemble a composite body constructed from relatively small heterogeneous members.

Another object of the invention is the provision of an opaque pigment supported in a plastic adhesive of suitable consistency for application in base relief, so that a distinct outline of substantial body, such as the mullions in leaded glass, may be produced with a realistic effect.

Another object of the invention comprehends the method of and materials for decorating a pane of transparent glass to attain the translucency, color and texture of a specimen of art glass or colored crystal. Thus a stained glass window may be repaired by the production of new elements which in the exercise of the improved method may be matched with fidelity of color, tone and density with fragments of the broken stained glass window.

Further the invention contemplates a method and combination of materials which in the hands of a competent artist will render the production of a replica of a work of art, such as a leaded stained glass cathedral window, facile and economic.

Other objects and advantages more or less ancillary to the foregoing and the manner in which all the various objects are realized will appear in the following description which, considered in connection with the accompanying drawing, illustrate an example of the application and treatment of the artists' materials contemplated within the present invention.

Fig. 1 is an elevational view of a pane of glass having a conventional design applied upon the surface thereof;

Fig. 2 is an elevational view shown upon an enlarged scale of a fragmentary portion of the stained glass shown in Fig. 1, illustrating in the conventional manner the contrasting colors in contiguous areas of the applied design;

Fig. 3 is a horizontal section through the glass panel illustrated in Fig. 2, the section being taken on a plane indicated by 3—3 in Fig. 2;

Fig. 4 is a sectional view similar to Fig. 3 but showing an alternate form of applying the artists' materials upon the surface of the glass;

Fig. 5 is a fragmentary portion of the glass panel illustrated in Figs. 1 and 2 but shown upon a still further enlarged scale and illustrating the appearance of the decorative materials applied in accordance with the method embodied herein;

Fig. 6 is a detailed enlarged view of the artists' materials as applied in simulation of leaded glass mullions; and Fig. 7 is a transverse sectional view of the glass segment shown in Fig. 6 illustrating the protrusion of the artists' material above the treated surface of the glass.

As shown in the drawing herein which illustrates the invention as applied in a replica of a leaded stained glass window the method is carried out by first thoroughly cleansing the glass panel 10. The design is next outlined upon the surface of the glass with chalk or a similar marking material of a non-oleaginous nature. Thereafter a narrow but relatively thick ribbon of an adhesive plastic 11 having an opaque material therein is applied upon the tracery of the design. An example of an opaque plastic which has been found satisfactory for such application is a conglomerate of finely divided metal and nitrocellulose dissolved to form a thick heavy paste. In forming this step of the operation the adhesive plastic is preferably applied by extrusive method through an instrument having a nozzle or die opening of the desired size and configuration to produce a profile suitable to the proportions and pattern of the design.

After the material 11 forming the outline of the design has been dried the areas 12 defined thereby are coated with a quick drying varnish or lacquer having color pigments therein, the depth or tone of color being governed by the appearance thereof under an artificial light or in the preparation of a replica of a work of art, such as a stained glass window, by the hue and tone of the copy. The appearance of color diffusion in art glass is simulated by a copious simultaneous application of one or more of the color varnishes to a corner or marginal edge of the area 12, which is being decorated, then inclining the pane of glass at a suitable angle to cause the fluidic drops of variegated color varnish to partially merge and flow in rivulets over the surface of the glass until dammed by the opposed wall 11 of plastic material which for illustrative purposes herein may be termed mullions.

When it is desired to obtain a rough or irregular surface upon the face of the glass being decorated the consistency of the color varnish is thickened and a more copious application made thereof. In this event the plate is tipped to an acute angle until the varnish flows over and covers the surface then the plate is readjusted to an obtuse angle until the varnish has dried. The color stratification or streaked appearance of the area is effected by the application of a small amount of varnish heavily ladened with pigment in an edge of the area and by adjusting the direction of inclination of the pane of glass to cause rivulets thereof to flow across the surface of the glass.

When the next adjacent area is treated a realistic appearance of art glass may be obtained by changing the direction of the inclination of the pane of glass so that the lineation of stratification is in angular relation to that formerly treated.

After the various areas have been thus decorated a clear lacquer is applied over the entire surface of the panel and in the event the glass is intended for use in a door or window where it will be subjected to close scrutiny the tracery of the design may be outlined with the plastic material 11 on the reverse side of the glass as indicated in Fig. 3.

Obviously other articles of ornamentation may be produced in the exercise of the present invention, such for instance, as the surface covering above described on other articles but with fine ribbons of the metallic laden plastic 11 traced, for example, in simulation of cloisonné work or the outline tracery of a plastic laden with a colored pigment in simulation of vermiculated work.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. The method of decorating a pane of glass in simulation of a leaded stained glass window which comprises cleansing the surface of a pane of transparent glass, outlining a design thereon, applying an adhesive plastic having a powdered metal therein in relatively narrow bands of substantial thickness upon the tracery of said design outline, separately coating each of the areas defined by the plastic outline with varnish having respectively variegated color pigments therein, inclining the pane of glass at different angles relative to each of the areas before said varnish has dried to control the direction of flow thereof, and coating the entire surface of the glass thus decorated with clear, transparent lacquer.

2. The method of decorating a pane of glass in simulation of a leaded stained glass window which comprises cleansing the surface of a pane of glass, outlining a design thereon, applying an adhesive plastic having powdered metal therein in relatively narrow bands of substantial thickness upon the tracery of said design outline, consecutively applying a plurality of globules of colored varnish to the surface of each of the areas defined by said plastic material and adjacent an edge thereof, tipping said pane of glass while said varnish is in a fluidic state to cause the various color varnish globules to partially merge and flow in one direction, repeating the operation in each adjacent area after the varnish in the previously decorated areas has dried, but tipping the pane of glass to cause the varnish to flow in a different direction than that of the contiguous areas, and coating the entire surface of the pane so decorated with lacquer.

3. The method of decorating a pane of glass in simulation of a leaded stained glass window which comprises cleansing the surface of a pane of glass, outlining a design thereon, applying an adhesive plastic having powdered metal therein in relatively narrow bands of substantial thickness upon the tracery of said design outline, applying said adhesive plastic upon the opposite side of said pane of glass over the tracery of said design outline, consecutively applying globules of varicolored varnish to an edge of the areas respectively defined by said outline, tipping said plate while the globules of varnish in each area are in a fluidic state to cause the color varnish globules to merge and flow over the surface of the glass and coating the surface of the pane thus decorated with lacquer.

4. The method of decorating a pane of glass in simulation of a leaded stained glass window, which comprises cleansing the surface of a pane of glass, outlining a design thereon, applying by extrusion plastic nitro-cellulose and powdered metal in a relatively narrow ribbon over the tracery of said design outline, coating the areas respectively defined by said plastic ribbon with varicolored varnish and treating said varnish while in a fluidic state to cause the varnish to flow in different predetermined directions.

5. An article of decoration comprising a pane of glass, ribbed tracing thereon formed of an adhesive plastic having a powdered metal therein, and streaked, colored varnish coatings upon each of the areas defined by said ribbed tracery, the streaks in each area being divergent to those in contiguous areas.

GEORGE A. STARK, Jr.